J. P. METZLER.
OCCUPANT PROPELLED VEHICLE.
APPLICATION FILED APR. 24, 1919.
1,348,888.
Patented Aug. 10, 1920.
2 SHEETS—SHEET 2.
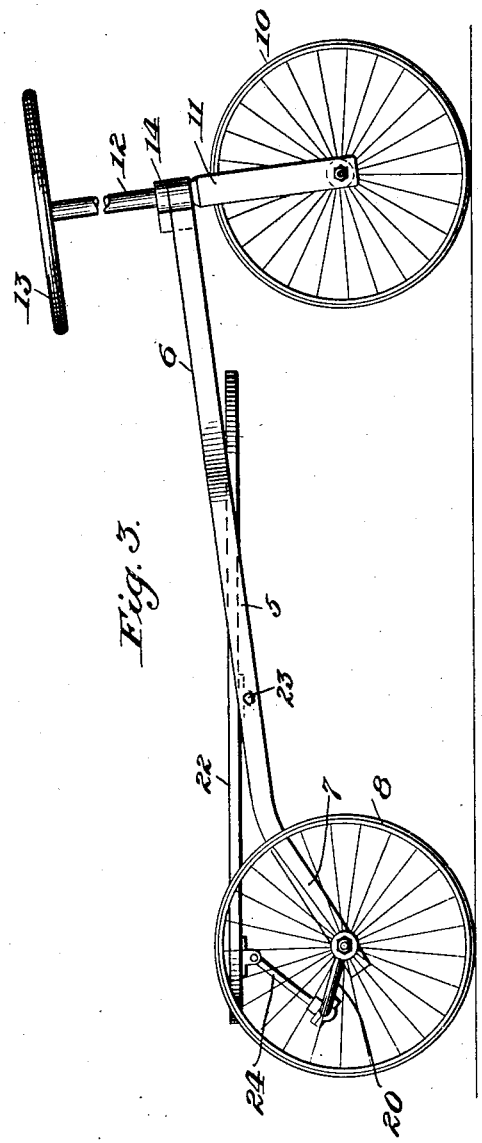
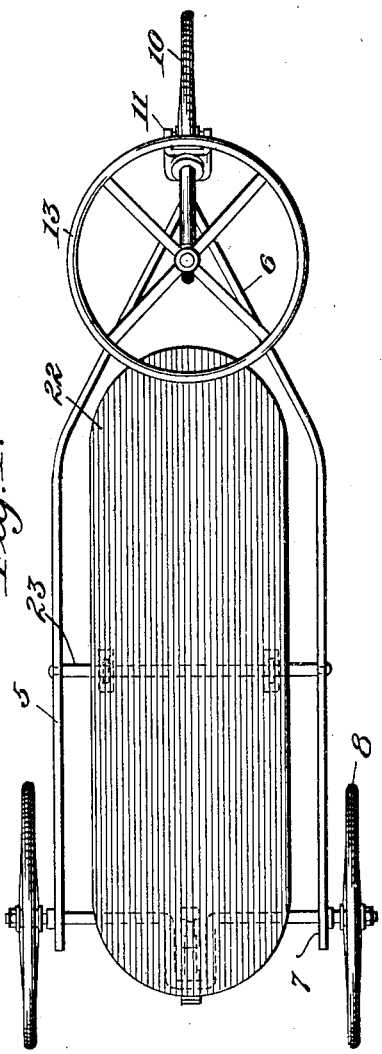
Inventor
Jacob P. Metzler,
By
Attorney

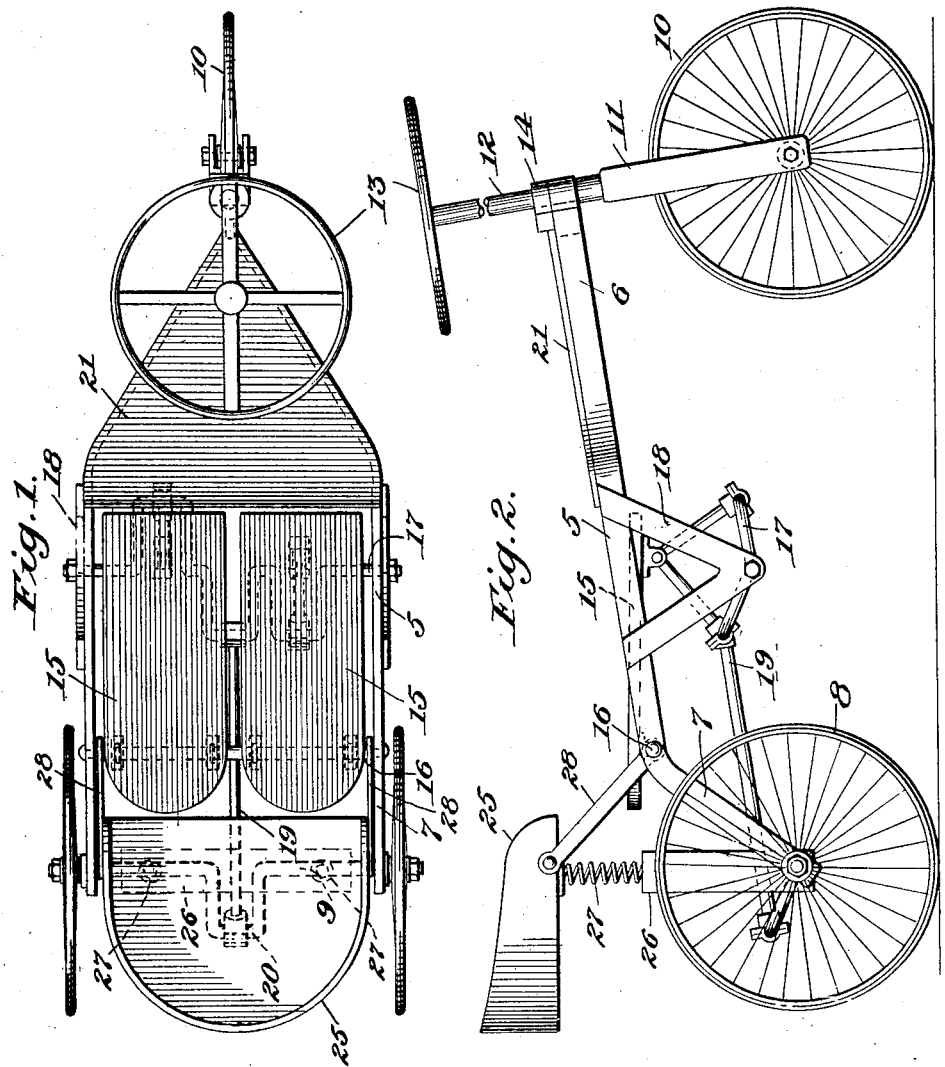

UNITED STATES PATENT OFFICE.

JACOB P. METZLER, OF GENEVA, NEW YORK.

OCCUPANT-PROPELLED VEHICLE.

1,348,888.  Specification of Letters Patent.  Patented Aug. 10, 1920.

Application filed April 24, 1919. Serial No. 292,426.

*To all whom it may concern:*

Be it known that I, JACOB P. METZLER, a citizen of the United States, residing at Geneva, in the county of Ontario and State of New York, have invented certain new and useful Improvements in Occupant-Propelled Vehicles, of which the following is a specification.

The present invention relates to occupant propelled vehicles, more particularly foot propelled vehicles for children, and consists in the combinations and arrangements of elements hereinafter described and particularly set forth in the accompanying claims.

The purpose of the invention is to provide an occupant propelled vehicle of this type which is of simple construction and easy to operate, and one which will not require any special skill on the part of the operator.

A further purpose of the invention is to construct a foot propelled vehicle wherein the construction and arrangement of operating and controlling parts are disposed in the manner that will properly distribute the weight of the operator to the best advantage for propelling and steering the vehicle.

The car is designed with special reference to the manufacturers' requirements and parents' approval in a vehicle of this type; to wit, economical and easy to manufacture and which will suggest itself as a proper medium for the healthful and mental development of children.

The invention is disclosed by way of illustration in the accompanying drawings, wherein—

Figure 1 is a top plan view of the car.

Fig. 2 is a side elevational view thereof.

Fig. 3 is a side elevational view of a modified structure of car, and

Fig. 4 is a top plan view of the car shown in Fig. 3.

Referring to the construction in further detail and wherein like reference characters designate corresponding parts in the different figures shown, the car consists of a frame structure 5 of appropriate bar metal which is in one continuous piece and shaped with a converging portion 6 at the front and having downwardly and rearwardly inclined portions 7, as shown. A pair of tractor wheels 8 is mounted on the axle 9 journaled in the frame portions 7, and a single steering wheel 10 is journaled in the fork 11. A steering shaft 12 is journaled in the steering head 14 at the front end of the body or frame and is provided with a steering wheel 13, as shown.

The means for manually propelling the car consists of a pair of treadles 15 fulcrumed within the frame on the shaft 16, and said treadles have crank arm connections with the crank shaft 17 that is journaled in the two depending brackets 18 suitably secured to the frame structure 5, and a pitman 19 connects said crank shaft 17 with the crank portion 20 of the axle 9 for operating the tractor wheels 8 as will be understood.

A seat or other supporting surface 21 is mounted on the forward portion of the frame 6 and immediately adjacent the steering control, and said supporting surface may appropriately be used for carrying a second person on the car or for conveying any reasonable burden that could be conveniently placed thereon.

The entire arrangement of the car body and the disposal thereon of all working or controlling parts are such that the operator may assume a natural position for riding and working the treadles to propel the vehicle, and a further purpose of said arrangement is that the entire weight of the operator is disposed in a manner most conducive to the easy travel and steering of the car.

The construction and arrangement of the type of car shown in Figs. 3 and 4 are in principle the same as that described above, though in this instance a single treadle or propelling medium 22 is employed instead of two side by side treadles as in the former instance. With the present arrangement the operating "board" or treadle 22 is fulcrumed on the shaft 23 approximately midway of its length obviously requiring the operator to work with one foot in advance of the other.

The treadle 22 is connected by a crank rod connection 24 with the crank arm 20 of the tractor wheels 8 after the manner of that shown in Figs. 1 and 2, and in this type of car also the general structure and arrangement of working parts are designed to accomplish the results above enumerated.

In the arrangement shown in Figs. 1 and 2 it is contemplated to provide a seat for another passenger, or it may be used by the rider of the car when resting or coasting.

A suitable arrangement for this purpose consists of the seat 25 mounted on the spring support (26, 27) and having the two bracing arms 28.

It is obvious that those skilled in the art may vary the details of construction and arrangement of parts without departing from the spirit of my invention, and therefore I do not wish to be limited to such features except as may be required by the claims.

What is claimed as new is:

1. An occupant propelled car comprising a frame formed of a single continuous bar strip, said strip providing side body portions having rearward and downward extensions providing journal bearings, and the front portion of the strip providing a steering head, tractor wheels journaled in said journal bearings, a steering wheel mounted in the steering head, and a treadle journaled in said side portions and located substantially in the plane of the body portions of the frame for propelling the car through the weight of the occupant thereon.

2. An occupant propelled car comprising a frame formed of a single bar strip having converging portions at the front meeting at a point and providing a steering head and having relatively widely separated side portions extending rearwardly and downwardly, a steering wheel mounted in the steering head, tractor wheels journaled in said side portions, a seat mounted on the frame converging portions immediately behind the steering head, treadles fulcrumed in the frame near the rear portion thereof, said treadles lying normally substantially within the plane of the frame and said seat, and driving connections between the treadle and the tractor wheels.

3. An occupant propelled car comprising a frame constructed from a single bar strip having converging front portions providing a steering head, and downwardly disposed rear portions providing journal bearings; a steering wheel mounted in the steering head, an axle journaled in said bearings, tractor wheels mounted on said axle, a pair of depending brackets mounted on the side portions of the frame, a crankshaft journaled in said brackets, a shaft mounted in the frame to the rear of said brackets, a pair of treadles journaled on said shaft, adapted to alternately bear the weight of the occupant thereon, arms connecting the crankshaft with said treadles respectively, and a pitman connecting the crankshaft with the tractor wheel axle, substantially as set forth.

In testimony whereof I affix my signature.

JACOB P. METZLER.